Feb. 13, 1973　　　A. C. GATTI　　　3,716,263
REFUSE COLLECTION DEVICE
Filed Feb. 9, 1972

United States Patent Office 3,716,263
Patented Feb. 13, 1973

3,716,263
REFUSE COLLECTION DEVICE
Alfred C. Gatti, 2152 E. 18th St.,
Brooklyn, N.Y. 11219
Filed Feb. 9, 1972, Ser. No. 224,665
Int. Cl. A47f 13/06
U.S. Cl. 294—19 R        7 Claims

ABSTRACT OF THE DISCLOSURE

A pair of scoops are pivotably mounted upon supporting arms affixed to a vertically adjustable shaft and handle, the scoops being maintained in an open position by springs biasing the scoops against plungers. When the scoops are in contact with the ground or other surface from which refuse is to be removed, the handle is depressed, thereby urging the scoops to a closed position where they are maintained by means of the plungers which are then permitted to descend so as to obstruct retraction of the scoops to their open position. A bag may be disposed around the scoops during these operations so as to enclose the refuse sought to be removed, the bag thereafter being discardable or otherwise disposable as desired.

BACKGROUND OF THE INVENTION

(1) Field of the invention

This invention relates to hand-operated means for collecting refuse, garbage, animal excrement and the like, and to a convenient means for disposal thereof after such collection. The invention also relates to means for retrieving or gathering articles and substances which have dropped out of reach or to which access is inconvenient or difficult.

(2) Description of the prior art

Heretofore, it has been customary to remove by a variety of hand-operated means, refuse, garbage, animal excrement and the like, which may have accumulated on sidewalks, roadways, lawns, floors and other places where their presence was deemed undesirable. Such hand-operated removal means has often been makeshift, inefficient and unsanitary; and when special apparatus has been employed for that purpose, it has often been expensive, unduly complex, unwieldy and difficult to operate. Furthermore, even though such hand-operated removal means may have effected the gathering of the substances or articles intended for removal, they may have accumulated upon the hand-operated removal means so as to interfere with its operation and be difficult and unpleasant to separate therefrom.

The present invention solves these problems.

Thus, it is an object of the present invention to provide a lightweight, convenient, hand-operated means for collecting and disposing of refuse, garbage, animal excrement and the like, in a rapid, efficient and sanitary manner.

Another object of the invention is to provide hand-operated means of the last-mentioned kind, which is of simple and inexpensive design and which is easy to operate.

Another object of the invention is to provide such hand-operated means which is operable in a manner which is not distasteful, and from which the articles or substances gathered thereby can be removed in a convenient, sanitary and pleasant manner.

Another object of the invention is to provide such hand-operated means which facilitates the avoidance of environmental pollution otherwise arising from the accumulation of the articles and substances removed thereby.

Another object of the invention is to provide such hand-operated means which may be employed conveniently for picking up articles and substances which have fallen to the ground or for retrieving or gathering articles or substances which otherwise would be inaccessible or to which access would be difficult.

Still another object of the invention is to provide such hand-operated means which is of sturdy design and which is of adjustable length as desired by the user.

Other objects and advantages of the present invention will become apparent from the following discussion when read in conjunction with the accompanying drawing.

SUMMARY OF THE INVENTION

The present invention comprises a pair of pivotably mounted scoops supported by a pair of arms affixed to an adjustable shaft and handle. The scoops are normally maintained in an open position by a pair of tension springs mounted on the arms, in which open position the scoops are slightly inclined towards each other. A plastic bag is preferably accommodated between the scoops, the mouth of the bag being folded back against the outside surfaces of the scoops and of the arms where it is removably retained in position by yieldable leaf springs.

In operation, the scoops are disposed so as to straddle the refuse or other article or substance intended for removal, thereby disposing said article or substance within the mouth of the bag. The handle is then pressed downwardly against the surface upon which said article or substance is deposited, thereby causing the scoops to close and at the same time closing the mouth of the bag and disposing said article or substance therein. A pair of plungers maintain the scoops in this closed position until the user removes the bag and its contents for disposal or discard, and returns the scoops to their original position wherein they may accommdate another bag and be reused.

BRIEF DESCRIPTION OF THE DRAWING

In the drawing.

Throughout the various views, similar numerals are employed to refer to similar parts of the invention.

DESCRIPTION OF THE PREFERRED EMBODIMENT

Figure 1:
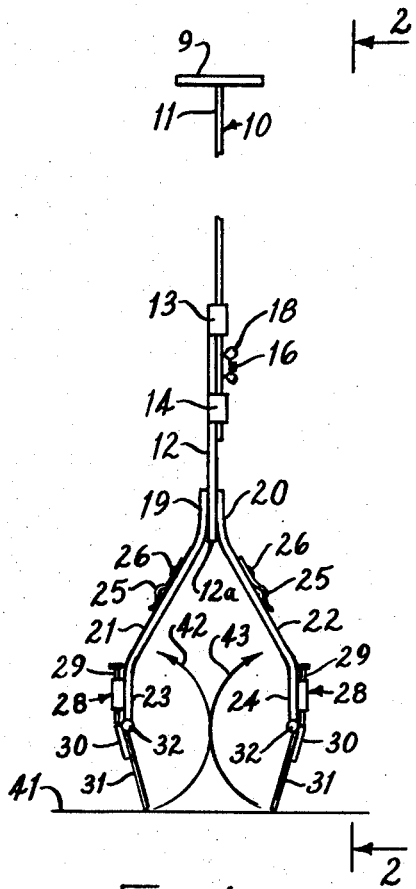
FIG. 1 is an elevational view of one embodiment of the present invention wherein the scoops are in their open position.
Figures 2, 6, 7:
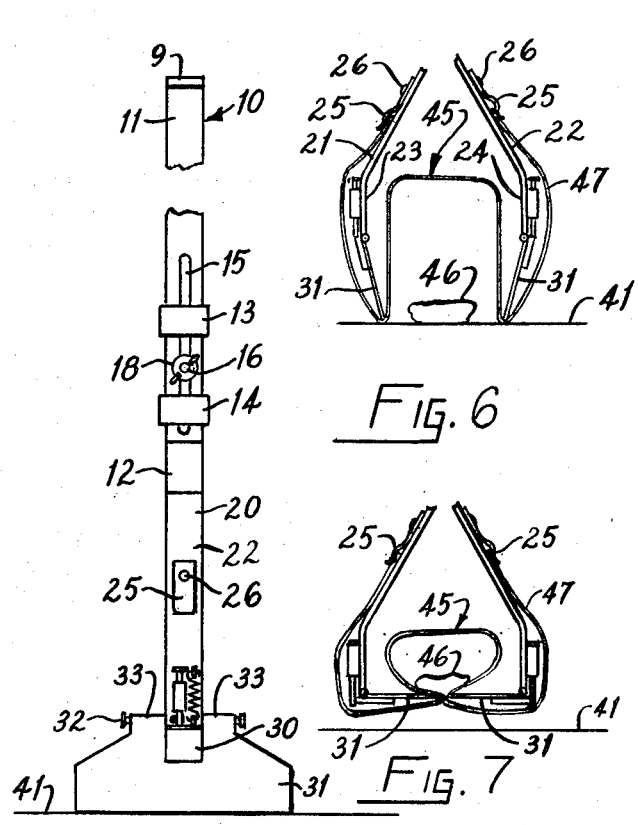
FIG. 2 is a view taken about the line 2—2 of FIG. 1.
FIG. 6 is a fragmentary view of the lower portion of the form of the invention depicted in FIG. 1 but showing a sectional view of a bag in operative position on the scoops employed in said form of the invention.
FIG. 7 is a view similar to that of FIG. 6 but showing the scoops in a closed position.

As may be seen in FIGS. 1 and 2 of the accompanying drawing, one embodiment of the present invention comprises a handle 9 affixed to an adjustable shaft, generally designated by the numeral 10 and including an extendible member 11, to which said handle 9 is affixed, and a column 12 provided with a pair of aligned sleeves 13, 14, the said extendible member 11 being slidably received within said sleeves 13, 14. The extendible member 11 is provided with an elongated slot 15 which accommodates a stud 16 threadedly engaged with a wing nut 18 or other adjustable means, the said stud 16 depending from the column 12. With this arrangement, it will be seen that upon loosening the wing nut 18, the extendible member 11 may be vertically adjusted with respect to the column 12 so that the extendible member 11 will project to any convenient distance above the aligned sleeves 13, 14 in which position the wing nut 18 may be tightened, thereby fixing the relative positions of the extendible member 11 and column 12 and accommodating the convenience of the user.

As may be seen in FIGS. 1 and 2, a pair of arms 19, 20 are affixed to and straddle the lower portion 12a of the column 12 and have inclined, intermedate portions 21, 22 and lower portions 23, 24. The intermediate portions 21, 22 are surmounted by springable means such as leaf springs 25 suitably affixed to said intermediate portions 21, 22 as by rivets 26.

The lower portions 23, 24 of the arms 19, 20 are provided with guide means, generally designated by the numeral 28 and slidably accommodating a pair of plungers 29 abuttable against bosses 30 surmounting a pair of scoops 31. The scoops 31 are pivotably mounted upon the said lower portions 23, 24 of the arms 19, 20 by means of shafts 32 which extend through a pair of flanges 33 formed integrally with each scoop 31, the said shafts 32 also extending through the lower portions 23, 24 of the arms 19, 20.

Figure 3:
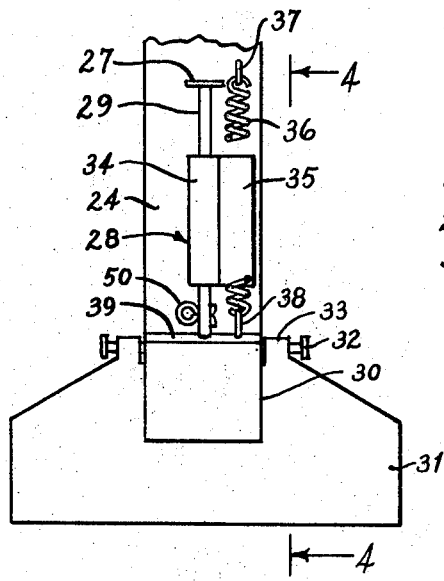
FIG. 3 is an enlarged, fragmentary view of the lower portion of the form of the invention depicted in FIG. 2.
Figures 4, 5:
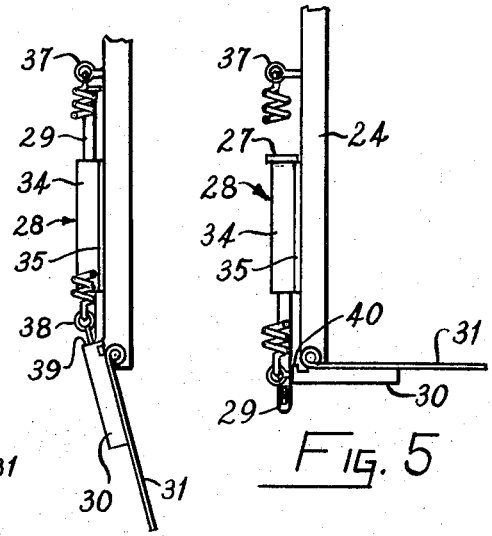
FIG. 4 is a view taken about the line 4—4 of FIG. 3 and showing one of the scoops in an open position.
FIG. 5 is a view similar to that of FIG. 4 but showing said scop in a closed position.

As may be seen in FIGS. 3 and 4, the guide means 28 include a sleeve 34 surmounting a flange 35 affixed to the lower portion 24 of the arm 20 (indicated in FIGS. 1 and 2), it being understood that a similar guide means 28 is affixed to the lower portion 23 of the arm 19 (indicated in FIGS. 1 and 2). A tension spring 36 is anchored to an eyelet 37 secured to the lower portion 24 of said arm 20 and is also anchored to an end face 39 of the boss 30. The boss 30 is provided with a lip 40 (as shown in FIG. 4) which is abuttable against the lower portion 24 of the said arm 20, thereby determining the maximum open position of the scoop 31, in which position the scoop 31 is inclined as shown in FIG. 4, it being understood that a similar inclination is accomplished in the same way with respect to scoop 31 mounted upon the lower portion 23 of the arm 19, as shown in FIG. 1. The tension spring 36 urges each scoop 31 to maintain said open position. The plungers 29 rest upon the end faces 39 of each boss 30.

It will be observed that when the scoops 31 are in contact with a surface 41 such as that of the ground, a roadway, floor or the like, and the handle 9 is depressed, the scoops 31 will be urged to pivot in the directions indicated by the arrows 42, 43 in FIG. 1 and to assume a horizontal position such as is depicted, for example, in FIG. 5 with respect to one of the scoops 31, this position being referred to herein as the closed position of the scoops 31.

Haxing assumed this closed position, each plunger 29 will be urged by gravity to descend to the position depicted in FIG. 5 where the head 27 of the plunger will rest against the guide means 28. In this position, each plunger 29 will abut against the end face 39 of each boss 30, thereby maintaining the scoops 31 in said closed position and obstructing their return to the previously described open position.

During the movement of the scoops 31 from their open to their closed position, they will gather articles or substances (not shown in FIG. 1) which may be disposed upon the surface 41 and between said scoops 31, whence said articles or substances may be retrieved or disposed of by the user as desired.

If the said articles or substances are such as would tend to adhere to the scoops 31 or if the articles or substances are deemed unpleasant to touch or are intended for discard, a bag, preferably composed of a flexible, waterproof plastic material and generally designated by the numeral 45 may be disposed so as to cover the scoops 31 and said lower portions 23, 24 as shown in FIGS. 6 and 7. As may be seen in FIG. 6, the bag 45 is disposed between the open scoops 31 which straddle an article or substance 46 intended for removal from the surface 41. The lip or marginal perimeter 47 of the bag 45 is folded back so as to cover the outer surfaces of the scoops 31, the said lip or marginal perimeter 47 being removably disposed beneath the leaf springs 25 and against the aforesaid intermediate portions 21, 22.

When the scoops 31 are urged to their closed position in the previously described manner, the article or substance 46 is gathered within the bag 45, closure of which is also effected, whereupon the bag 45 and said article or substance 46 may be lifted from the surface 41, as shown in FIG. 7. The bag 45 may thereafter be removed from the scoops 31 for discard or disposal as desired; and the plungers 29 may be returned to their previous raised positions so as to permit the scoops 31 to return to their open positions. A cotter pin 50 may be provided in each plunger 29 so as to prevent accidental removal thereof from the guide means 28.

From the foregoing, it will be seen that the above described invention accomplishes its objects in a convenient, efficient, practical and sanitary manner, and that subsequent to the above described operations, the invention is readily available for reuse either with or without another bag, as desired.

The embodiment of the invention illustrated and described hereinabove has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:

1 A device for collecting articles and substances, comprising in combination:
 (a) a handle;
 (b) an adjustable shaft surmounted by said handle;
 (c) a pair of outwardly inclined arms depending from said adjustable shaft;
 (d) pivotable means depending from said arms;
 (e) said pivotable means being normally maintained in an inclined, open position by spring means depending from said arms;
 (f) said pivotable means being disposable into a horizontal, closed position when said pivotable means are in abutment wiht a surface and said handle is depressed;
 (g) descendible means depending from said arms and contactable with said pivotable means when it is in said closed position, thereby obstructing the return of said pivotable means from said closed to said open position.

2. A device according to claim 1, said adjustable shaft including:
 (a) an extendible member affixed to said handle and provided with an elongated slot;
 (b) a column provided with
   (i) a pair of aligned sleeves; and
   (ii) a stud projecting through said elongated slot;
 (c) said stud being threadedly engaged with a wing nut abuttable against said extendible member, thereby fixing the relative positions of said extendible member and said column;
 (d) said pair of outwardly inclined arms being affixed to the lower portion of said column.

3. A device according to claim 2,
 (a) said outwardly inclined arms being affixed to said column;
 (b) said outwardly inclined arms including inclined intermediate portions and downwardly extending lower portions;
 (c) a pair of leaf springs affixed to said inclined intermediate portions;
 (d) said downwardly extending lower portions being provided with a laterally extending shaft;

(e) said pivotable means being swingably engaged with the shaft.

4. A device according to claim 3,
(a) said descendible means including a pair of plungers slidably received within guide means affixed to the downwardly extending lower portions of said arms;
(b) said pivotable means including:
   (i) a pair of scoops;
   (ii) bosses provided on said scoops;
   (iii) said plungers being abuttable against said bosses;
   (iv) said spring means being anchored on said bosses and said downwardly extending lower portions of said arms;
   (v) said bosses including flange means abuttable against the downwardly extending lower portions of said arms, thereby determining an open position of said scoops;
(c) said scoops being in an inclined position when in said open position.

5. A device according to claim 4,
(a) said scoops being urged to a closed position when pressed against said surface;
(b) said plungers being descendible when said scoops are disposed in said closed position, thereby said plungers are abuttable against said bosses, thereby obstructing return of said scoops to said open position.

6. A device according to claim 4,
(a) a bag disposed intermediately of said scoops;
(b) the marginal perimeter of said bag being folded against the outer surfaces of the intermediate portions of the outwardly inclined arms;
(c) said marginal perimeter of said bag being removably engaged between said leaf springs and said outer surfaces of the intermediate portions of the outwardly inclined arms;
(d) said bag being disposed in a closed position when the scoops are disposed in their said closed position;
(e) said scoops being swingable on said laterally extending shaft, thereby retracting said scoops from said closed position and permitting removal of said bag after closure thereof.

7. A device according to claim 6, said bag being composed of a flexible waterproof plastic material.

References Cited

UNITED STATES PATENTS 2,507,655   5/1950   Welshans et al. _____ 56—333
3,446,525   5/1969   Jones _____ 294—19 R EVON C. BLUNK, Primary Examiner J. D. CHERRY, Assistant Examiner U.S. Cl. X.R.
294—1 R, 50.8